United States Patent [19]

Socard

[11] Patent Number: 5,447,475

[45] Date of Patent: Sep. 5, 1995

[54] DEVICE AND PROCESS FOR SYNCHRONOUS CONTROL OF BICYCLE DERAILLEURS

[76] Inventor: Didier Socard, 5 Quai des Côteaux, 44640 Le Pellerin, France

[21] Appl. No.: 930,594

[22] PCT Filed: Apr. 2, 1991

[86] PCT No.: PCT/FR91/00256

§ 371 Date: Jun. 29, 1993

§ 102(e) Date: Jun. 29, 1993

[87] PCT Pub. No.: WO91/15393

PCT Pub. Date: Oct. 17, 1991

[30] Foreign Application Priority Data

Apr. 3, 1990 [FR] France .................. 90 04250

[51] Int. Cl.[6] .............................. F16H 61/36
[52] U.S. Cl. .................................. 474/69; 474/78
[58] Field of Search ............... 474/69, 70, 78-82

[56] References Cited

U.S. PATENT DOCUMENTS 3,965,763  6/1976  Wechsler .
4,201,095  5/1980  Cirami .
4,412,828  11/1983  Darby .
4,504,250  3/1985  Juy ..................... 474/78 X
5,033,991  7/1991  McLaren ............... 474/80 X

FOREIGN PATENT DOCUMENTS 2530573  1/1984  France .

Primary Examiner—Michael Powell Buiz
Attorney, Agent, or Firm—Young & Thompson

[57] ABSTRACT

Device for management of two derailleurs for cycles. The device comprises actuating levers connected to two derailleur gears by transmission cables ($C_1$, $C_2$). It is characterized in that it comprises a cam (26, 81, 82) which is driven in rotation with respect to a second element (42, 64) by the action of actuating levers and which acts on an element of a fixed part (12, 60) of the device. The reaction of the fixed part induces a movement of a part (20, 71, 72) of the device carrying at least one of the elements and on which the transmission cables are integral. The movement occurs simultaneously with the rotation of the first element (26, 80), so that traction is exerted at the same time in the same direction on the transmission cables ($C_1$. $C_2$), one of which is caused to move. The device is particularly useful in the cycle industry.

12 Claims, 7 Drawing Sheets

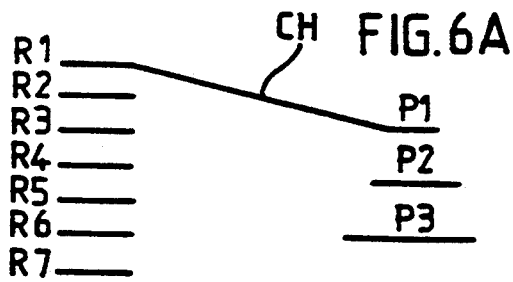
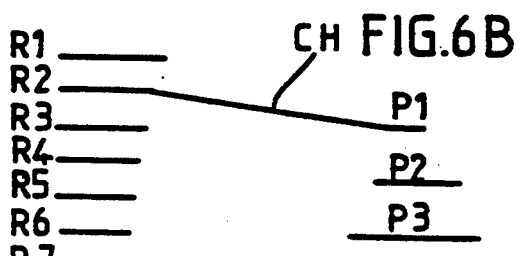
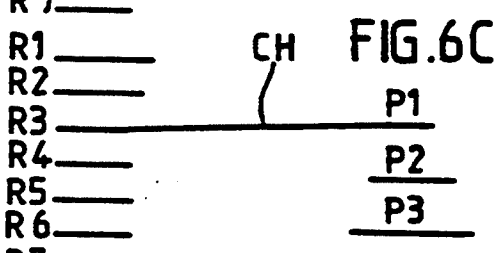
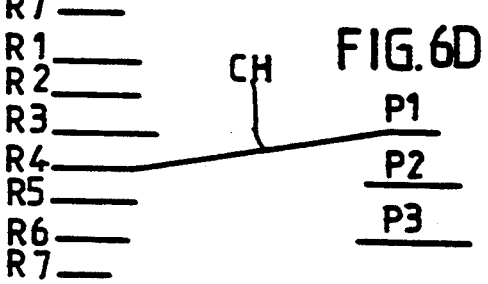
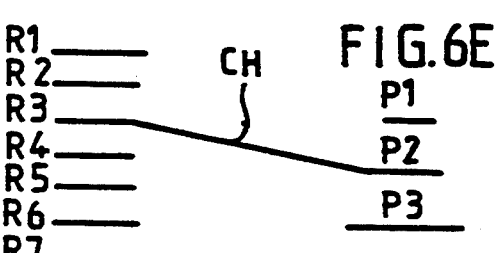
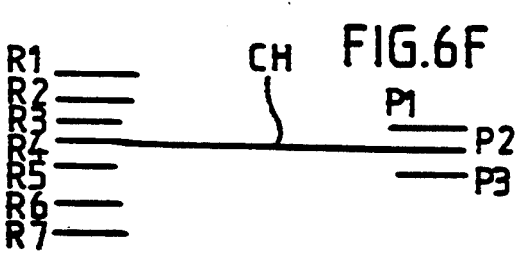
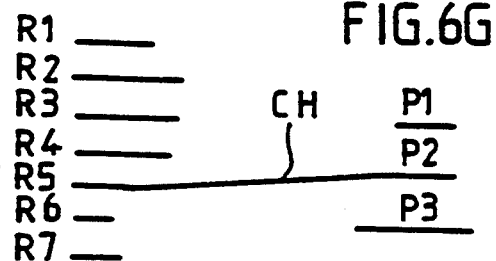
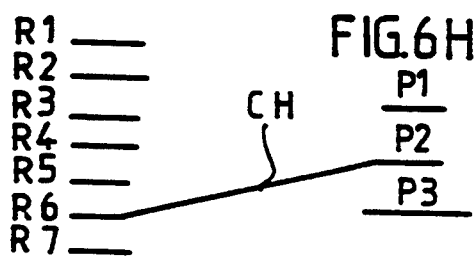
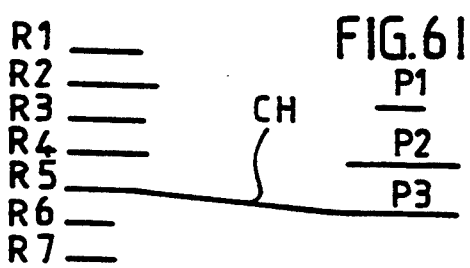
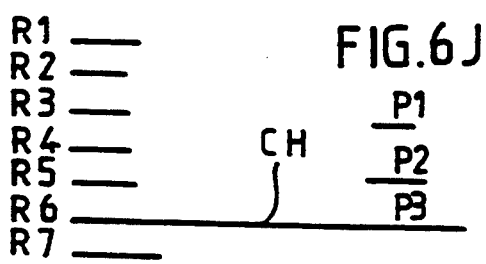
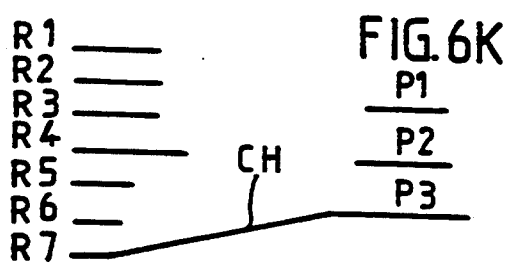

DEVICE AND PROCESS FOR SYNCHRONOUS CONTROL OF BICYCLE DERAILLEURS

FIELD OF THE INVENTION

The present invention relates to bicycle derailleurs and more particularly to devices for controlling these derailleurs.

BACKGROUND OF THE INVENTION

Bicycles or cycles in general, are these days most often provided with a rear derailleur or free wheel derailleur and a forward or pedal derailleur.

The forward derailleur guides and positions the chain on two or three chain rings. The rear derailleur performs a similar job on six or eight pinions. There result substantial lateral displacements of the chain and this increases the risk of placing the chain in torsion with the drawbacks that result therefrom (poor performance, chain disengagement, wear on parts, etc.). This same increase in the number of relative ratios gives rise to a greater complexity in the choice of these latter and errors are frequent (gear changing involving a large increase in effort, error in the direction of manipulation of the shift levers, calculation necessary before changing speed, a need to control visually the position of the chain to know the action to take).

Devices have already been proposed tending to solve these different problems but none has solved all of them.

For example, FR-A-2,530,573 has for its object a device for controlling two derailleurs, comprising two actuating members each connected to two derailleurs by a transmission member, the device comprising a manipulating member of one of the actuating members connected to the other actuating member by a lost motion connection.

This arrangement permits, by a single control member, controlling simultaneously the two derailleurs and the lost motion connection provided in the transmission permits offsetting the control of the pedal derailleur relative to the control of the free wheel derailleur.

Such a device solves the problem of misalignment of the chain but gives rise to a jolt in pedaling due to the amplification of the abruptness of changing the gear by a change of pinion in the same direction.

U.S. Pat. No. 4,412,828 describes a simultaneous control device for a front derailleur with two chain rings and a rear derailleur with five pinions by means of a system of cams and cam followers. This device is adapted to actuate step by step the rear derailleur to the central pinion and change of gear while remaining on this central pinion, then actuating step by step for the remaining pinions. This known device uses in practice half the pinions for each respective level. It is difficultly adaptable to modern derailleurs with three levels and more than five pinions. Moreover, the simultaneous control is continuous, which gives rise to a long path for the control member and bulkiness of the assembly.

U.S. Pat. No. 4,412,828 describes a simultaneous control device for derailleurs, for example with two levels and five pinions, ensuring ten ratios by this combination. This system, which requires practically alternate changes of level with the simultaneous passages from one or several pinions, ensures a transmission ratio varying in a continuous manner. This device, which would be very complicated for a large number of gear ratios, does not concern itself with the angle of the chain.

Moreover, all the known devices are controlled by a shift lever or a handle which can occupy as many positions as there are usable speeds, such that the cyclist must pay attention to the effective position of the shift lever before actuating it in one direction or the other. Moreover, as indicated in connection with U.S. Pat. No. 4,412,828, such a device is bulky because of the long path of the control member.

SUMMARY OF THE INVENTION

The present invention has particularly for its object to overcome this drawback while proposing a mounting which renders highly visible for the user all relative displacements of the derailleur, which displacements can be controlled by impulse.

To this end, the invention relates to a device for controlling two derailleurs for bicycles comprising actuating means connected to the two derailleurs by transmission means, as well as a first member adapted to follow a cycle of simultaneous displacement of the two derailleurs, acting in combination with a second member adapted to fix the initial positions of each of the cycles, characterized in that said first member is a cam driven in rotation relative to a second member under the action of actuating means, and acting relative to an element of a fixed portion of the device, whose reaction gives rise to the displacement of a movable part of the device carrying at least one of said members, and on which are integral the transmission means, the displacement taking place simultaneously with the rotation of the first member, so as to ensure simultaneous traction in the same direction on said transmission means, while effecting a displacement of one of these means.

According to a characteristic of the invention, the movable part carries on the one hand the first member or cam and on the other hand the second member constituted by a cylinder, with which cylinder are integral the transmission means and whose rotation effected by the actuating means gives rise, by means of a demultiplier, to the rotation of the cam.

According to an embodiment of the invention, the cam is articulated in rotation about a fixed axle integral with the movable part, by means of a circular hole from the center of which are provided a plurality of holes receiving the indexing means of radius E and mutually orthogonal, whose centers lie on a circle of radius R and at a variable distance from the edge of the cam respectively equal to $X+r+R$, $X+r+R+Y$, $X+r+R+2Y$, etc., to constitute a pre-selected program.

The invention also relates to an improved process for simultaneous control of two derailleurs.

BRIEF DESCRIPTION OF THE DRAWINGS

The invention will be illustrated without any limitation by the description which follows, given in respect to the accompanying drawings, in which:

FIGS. 6A–6K show schematically the successive positions of the chain in the sequences corresponding to FIGS. 5A–5K;

DETAILED DESCRIPTION OF THE INVENTION

Figure 1:
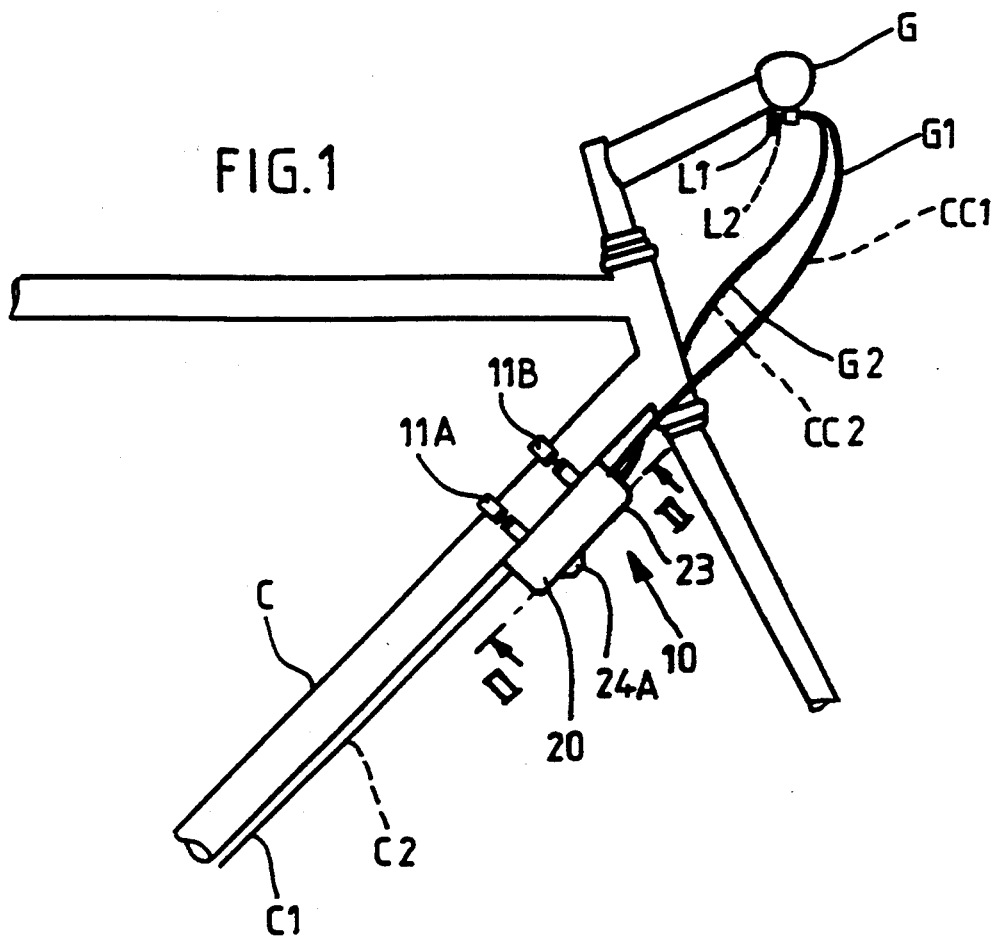
FIG. 1 is a fragmentary view of a bicycle showing sideways the control device according to the invention.
Figure 2:
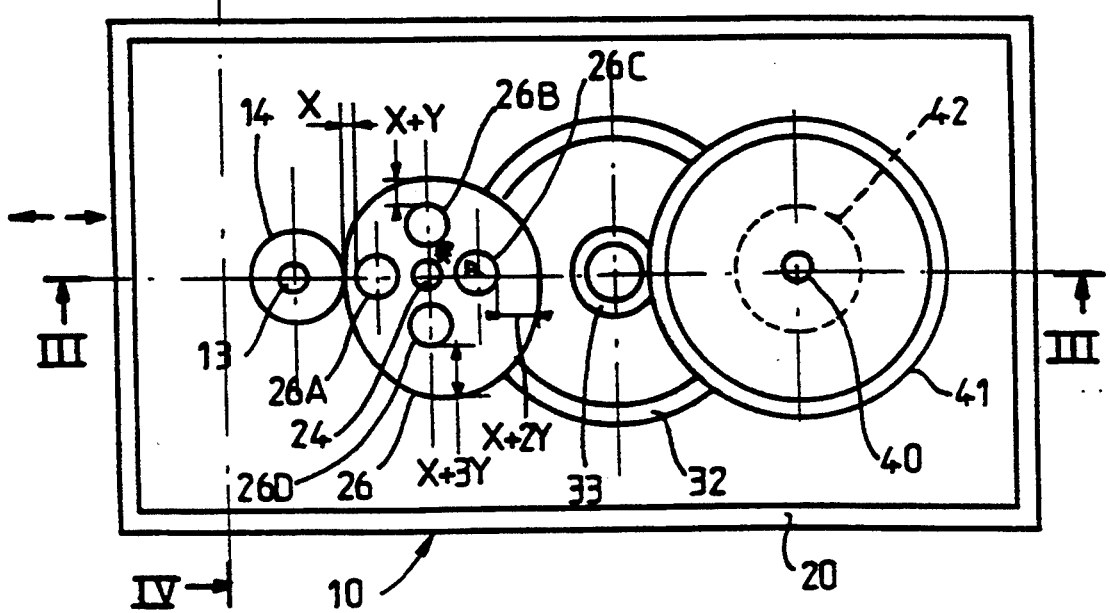
FIG. 2 is a cross-sectional view on line II—II of FIG. 1 according to a first embodiment of the invention.
Figure 3:
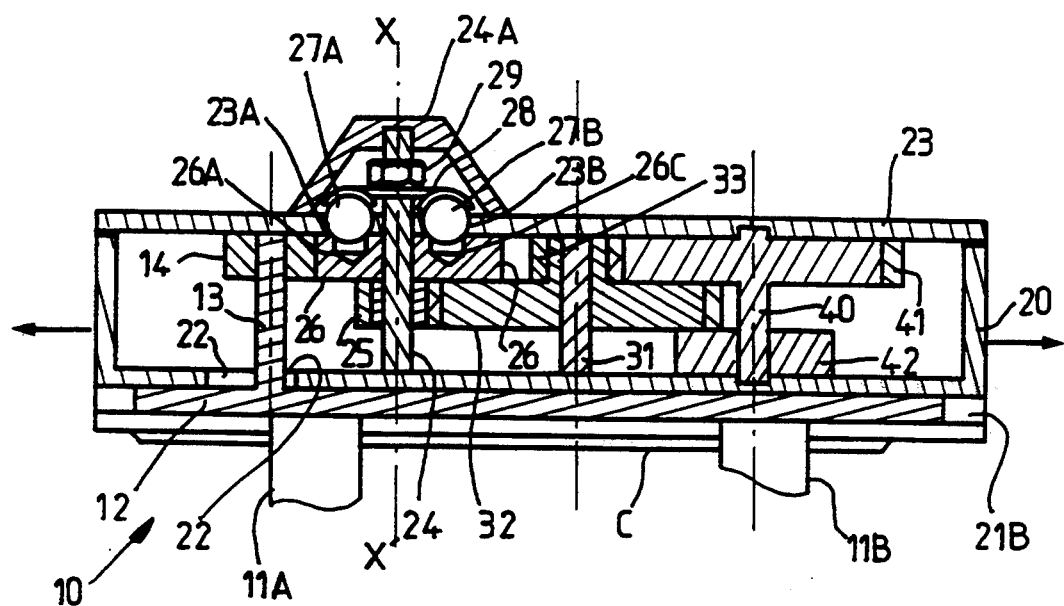
FIG. 3 is a cross-sectional view on line III—III of FIG. 2.

FIG. 1 shows a part of a cycle frame C provided with a handlebar G in relation to which are disposed in a very schematic fashion (see FIGS. 6A to 6K) three chain rings P1, P2, P3 and a free wheel which comprises seven pinions R1, R2, R3, R4, R5, R6, R7.

Two derailleur mechanisms (not shown) which can be of conventional design and construction are provided to make the chain CH pass from one pinion R to the other and from one chain ring P to the other.

These two derailleurs are actuated respectively by transmission means constituted by cables $C_1$ and $C_2$. FIG. 1 shows only the beginning of these cables.

The control device is constituted by actuating means, in this case two levers L1 and L2, mounted by any appropriate means on either side of the handlebar G. These levers serve when moved to exert traction on control cables CC1 (respectively CC2) which are disposed in sleeves of ordinary type G1 (respectively G2) which guide the cables to the control device 10 for the derailleurs. These levers are thus comprised in known manner of a device for securement to the handlebar or to the brake lever, of a fixed abutment sleeve, of a device for blocking the cable pin and for exerting traction on this pin which is articulated about an axis and which will not be described here.

The other end of each cable CC1 and CC2 extends to the interior of the control device for the derailleurs.

This derailleur control device is fixed to the frame by any appropriate means, two collars 11A and 11B in this example, preferably on the diagonal tube of the frame C, in a location adapted not to interfere with the movement of the forward wheel and of the mud guard.

The control device 10 comprises a guidance table 12 forming a right parallelepiped on which will be fixed removably a rotation axle 13 which supports an abutment 14 free to rotate about this axle and if desired one or two devices for the adjustment of displacement (not shown in the drawings), adapted to demultiply the initial displacements of the cables $C_1$ and $C_2$ to adapt them to the required displacement for each derailleur which is associated with them (this displacement being adapted to vary from one model of derailleur to another). These adjustment devices can be staged pulleys or lever arms or any other appropriate means.

A housing 20 can slide on the table 12 by means of slideways 21A and 21B, when the axle 13 is removed. A window 22 is provided in the base of the housing 20 to permit mounting the axle 13 and the longitudinal displacement of the housing 20 relative to the table 12.

The housing 20 comprises a removable cover 23 which is fixed to it by any appropriate means. The housing 20 comprises moreover a cylindrical axle 24 on which are mounted a toothed wheel 25 and a cam 26. The cam 26 bears against the abutment 14 under the action of the tension of cables $C_1$ and $C_2$. The cam 26 is pierced by four holes 26A, 26B, 26C, 26D spaced 90° about a circle whose center is located on the axle 24.

As a function of the rotation of the cam 26 about the axle 24, these four holes receive alternatively balls 27A and 27B of a diameter greater than the diameter of the holes 26A to 26D. These balls 27A and 27B are guided in linear displacement by calibrated holes 23A and 23B provided in the cover 23. These holes are pressed against the cam 26 by means of a spring 28 whose pressure is adjusted by the gripping more or less strongly of a nut 29 on the axle 24.

The assembly of members 24, 26, 27, 28 and 29, with the guide holes 23A and 23B, thus permits an indexing in rotation of the cam 26 each 90°.

The cam 26 has a particular contour which responds to the following criteria:

during a rotation of 90°, from the position corresponding to the smallest radius toward the following position, this radius increases by a value Y;

during a similar rotation from this new position, the same is true;

likewise a third time;

during the following similar rotation, this radius diminishes abruptly by 3Y to return to the initial contour after one complete turn.

This special contour of the cam 26 thus defined is one of the essential characteristics of the invention.

A cover 24A is screwed on the axle 24 to ensure protection from dirt in the interior of housing 20, while permitting easy access to the adjustment of the difficulty of indexing the cam 26.

Figure 4:
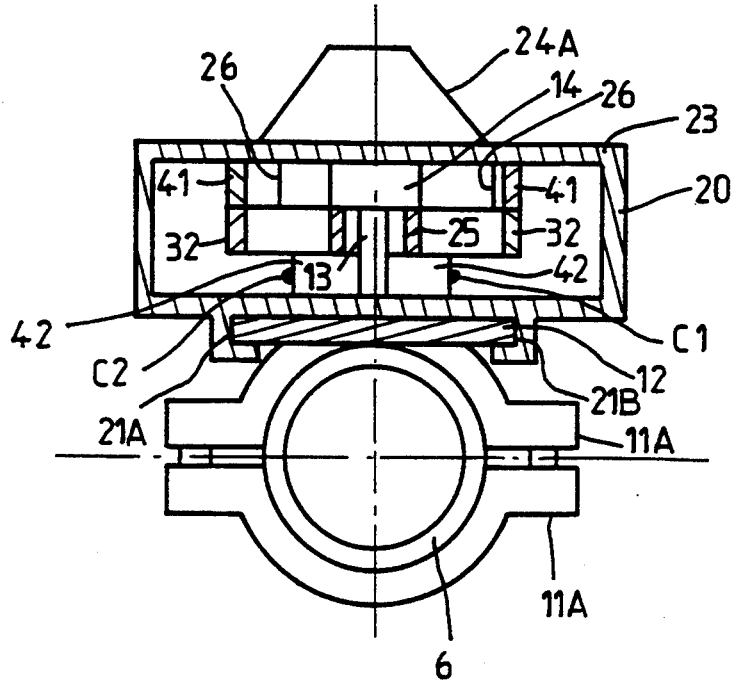
FIG. 4 is a cross-sectional view on line IV—IV of FIG. 2.

A toothed wheel 25 secured to the cam 26 drives in rotation the toothed wheel 32 (and vice versa) itself fixed to the toothed wheel 33. These latter two are mounted on an axle of rotation 31 secured to the housing 20. The toothed wheel 33 drives in rotation the toothed wheel 41 (and vice versa) which is itself fixed in rotation with a cylinder 42. The wheel 41 and the cylinder 42 are fixed to an axle 40 adapted to turn in the housing 20. The cylinder 42 supports on opposite sides of its periphery (FIG. 4) the cables $C_1$ and $C_2$ by any conventional means.

The cables $C_1$ and $C_2$ are then guided toward the adjustment members described above (if they exist) then actuate in the usual manner the deformations of the front and rear derailleurs of the cycle.

The toothed wheel 41 and the cylinder 42 are simultaneously controlled in rotation by a control device 5 constituted by a lever 52 articulated on the axle 40, driven over an angular interval under the action in traction of cable CC1 or CC2 by means of a member 53 on which is fixed the end of cable CC1 and which is resiliently urged by a resilient member 51 in the form of a pin.

The traction of cable CC1 effects, through a pawl 54 of the member 53, a rotation of the toothed wheel 41 and of the cylinder 42 in the direction opposite that of the traction of cable CC2.

The traction of CC1 (or CC2) therefore causes a rotation of the toothed wheel 41 and of the cylinder 42 comprised between 0° and at least one-third of the total rotation possible for this assembly (41, 42), this in a manner to pass beyond at least one position of the cam 26. After traction of the cable CC1 (or CC2), the resilient member 51 returns the lever L1 (or L2) to its initial position by means of the cable CC1 (or CC2).

After the return of the actuated lever L1 or L2, the pawl 54 permits the rotation of the assembly 41-42 in either direction without the tractive action of cable CC1 or cable CC2 provided that the cylinder 42 has not reached one of its end positions.

The cylinder 42 is adapted to wind up the cables $C_1$ and $C_2$ about a radius which corresponds to the following equation:

wherein D is the demultiplication caused by the succession of the toothed wheels 25, 32, 33 and 41:

$D = Nb$ teeth 41.Nb teeth 32/(Nb teeth 33.Nb teeth 25);

Y is the length about the cam 26 as defined above; R is the radius of cam 42 in question, thus:

$R = 2.Y.D:Pi.$

It will thus been seen that the assembly of the toothed wheels prevents a winding of the cables $C_1$ and $C_2$ about a too small radius, which would be a source of problems of precision and wear, given the rigidity of these cables.

Figure 5A:
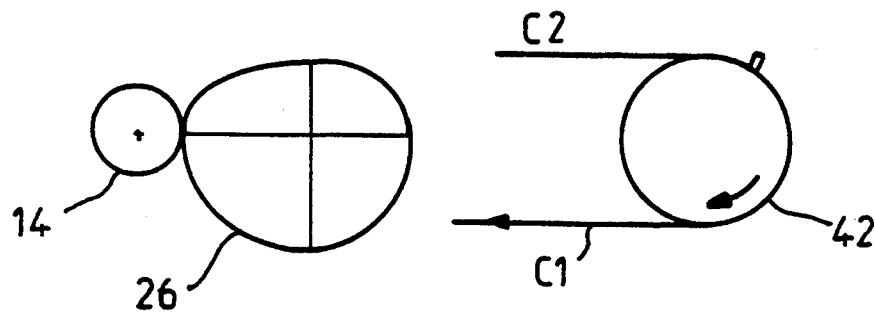
FIGS. 5A–5K show schematically the successive relative positions of the control elements of a device according to the invention during passage from the least to the greatest gear ratio.

The operation of the control device which has been described is as follows:

Considering first that the chain occupies the position shown in FIG. 6A, which corresponds to the minimum demultiplication ratio possible, the members 14, 26, 42, $C_1$ and $C_2$ occupy the positions schematically shown in FIG. 5A, which is to say the maximum elongation.

An elemental force AE1, exerted on the toothed wheel 41 and the cam 42 by the lever L1 by means of the cable CC1 connected to the control member such as described above, causes the cylinder 42 to turn by 90°/D, which drives the rotation of the cam 26 through 90°. These new positions then correspond to FIG. 5B. The cable $C_1$ is thus subjected to the following movements:

unwinding about the cam 42 over a length Y, which effects the displacement of the assembly relative to the fixed axle 13 toward the associated derailleur, namely the rear derailleur.

return of the axle 42 by a length Y because of the rotation of the cam 26 (this is again a displacement toward the associated derailleur).

Thus the cable $C_1$ displaces toward the derailleur which is associated with it by a length 2Y.

In the same time the cable $C_2$ is subjected to the following displacements:

winding about 42 by a length Y (away from the derailleur);

approach of the axle 42 by a length Y (toward the derailleur).

Thus the cable $C_2$ does not move.

As a function of the adjustment members, optionally present, this results in:

deformation of the rear derailleur which causes passage of the chain from the pinion R1 to the pinion R2;

no variation in position of the forward derailleur.

This new position of the chain is represented in FIG. 6B.

From this position, the reverse action $(-AE1)$ returns to the preceding position.

Figure 5B:
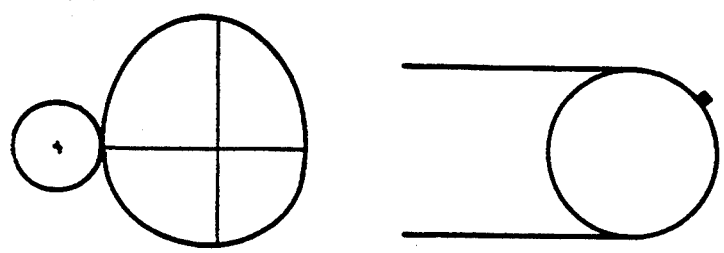
Figure 5C:
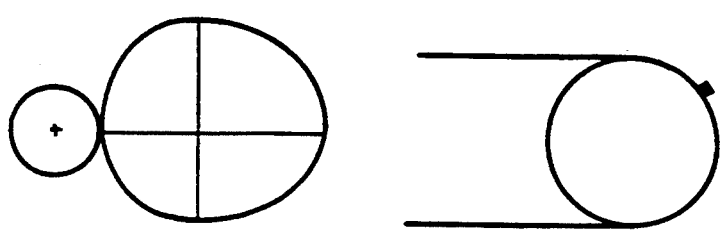
Figure 5D:
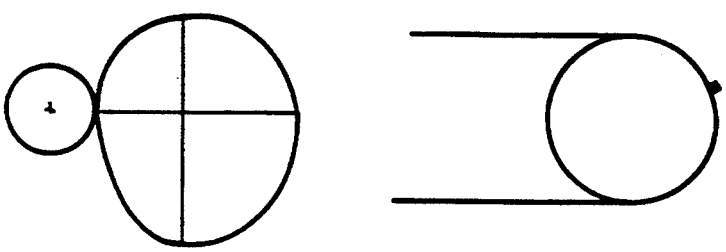

From these positions shown in FIGS. 5B and 6B, a new elemental action AE1 causes the new positions of the cylinder 42 and the cam 26 shown in FIG. 5C. As in the stage described above, $C_1$ displaces by a length 2D toward its associated derailleur and $C_2$ remains stationary. As a result, the chain occupies the position shown in FIG. 6C. And a new action AE1 results in the positions of the members as seen in FIG. 5D and in a position of the chain in FIG. 6D.

Figure 5E:
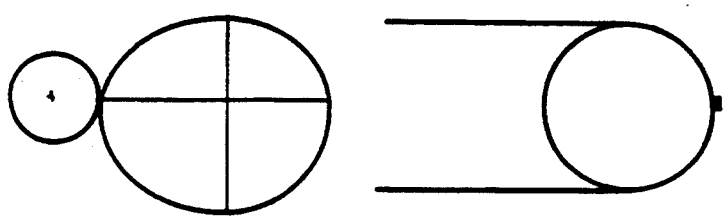
Figure 5F:
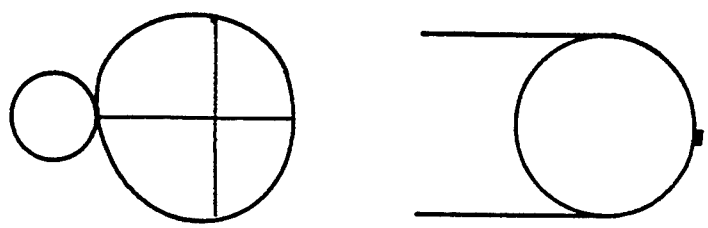
Figure 5G:
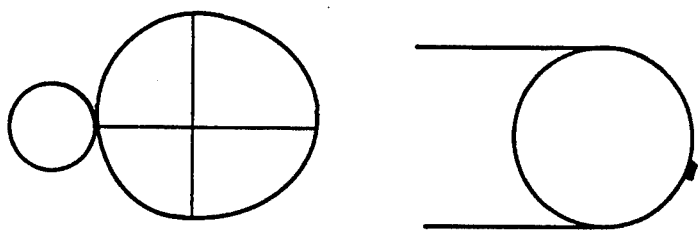
Figure 5H:
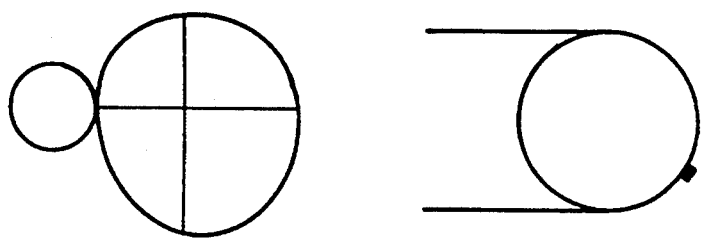
Figure 5I:
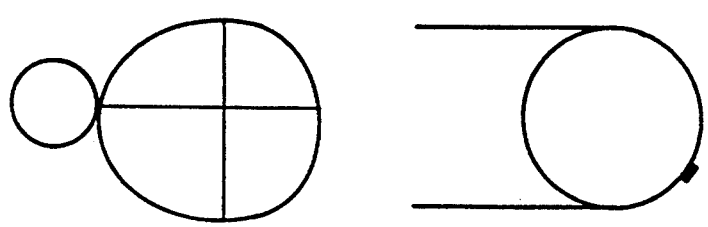
Figure 5J:
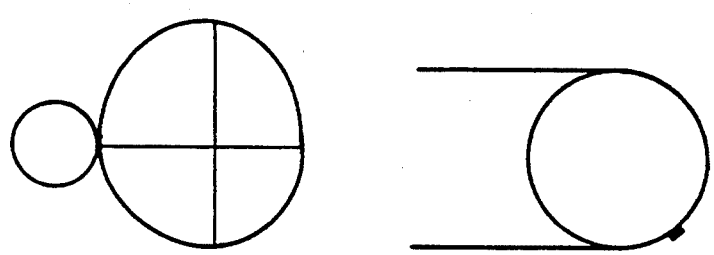
Figure 5K:
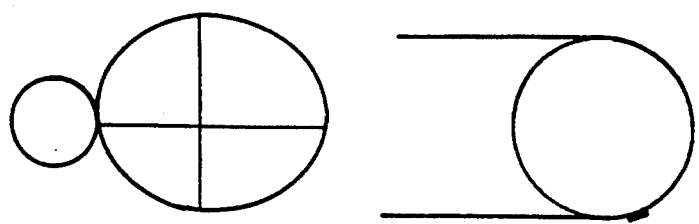
Figure 7:
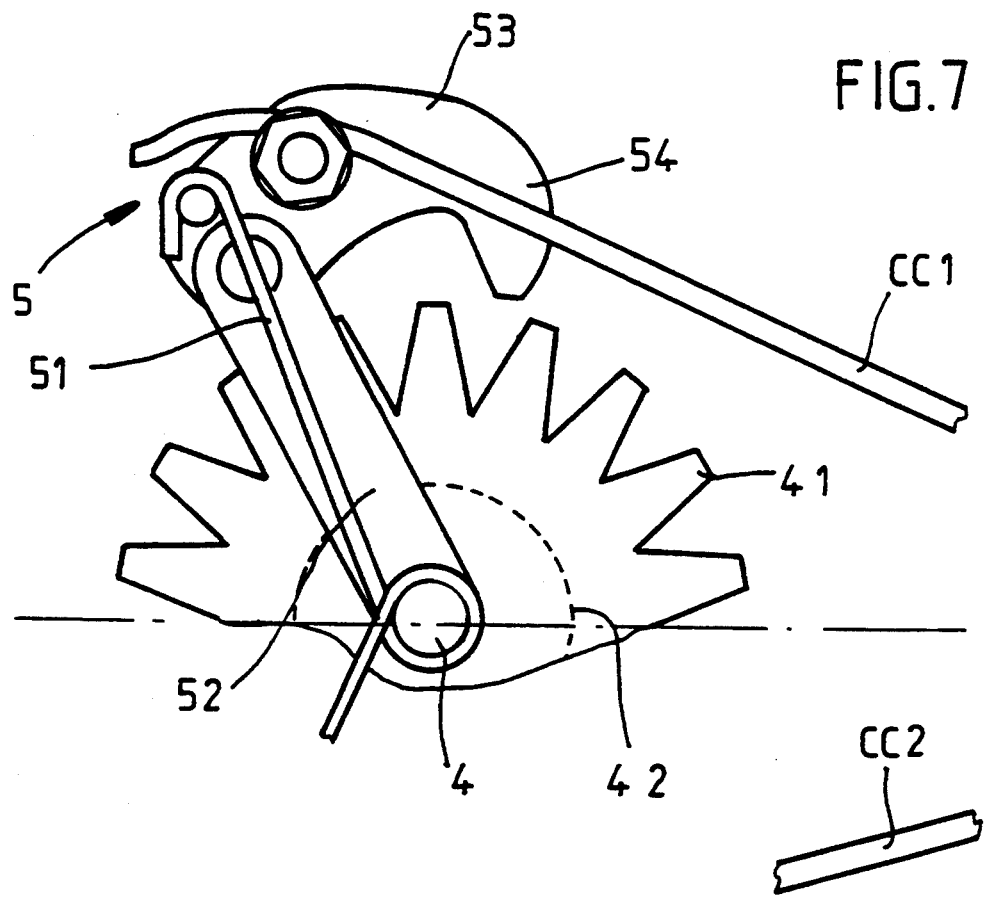
FIG. 7 shows by way of example a control device of the succession of the sequences 5A–5K.

Thereafter, and this is a major feature of the invention, a new elemental action AE1 produces a result very different from that of the preceding actions:

the cam 42 and the cam 26 will come to occupy positions shown in FIG. 5E. These new positions cause the following movements:

For the cable $C_1$:

unwinding about 42 by a length Y (toward the derailleur);

spacing of the axle 42 by a length 3Y (away from the derailleur);

Balance: spacing of the derailleur by a length 2Y, which effects rising of a pinion (from R4 toward R3);

For the cable $C_2$:

unwinding about 42 by a length Y (opposite the derailleur);

spacing of the axle 42 by a length 3Y (away from the derailleur);

Balance: spacing of the derailleur by a length 4Y, which is effective, when using if desired adjustment members, to deform the forward derailleur to effect the passage from chain ring P1 to chain ring P2.

The new position of the chain is shown in FIG. 6E.

From there, the sequence 5E, 5F, 5G, 5H, 5I is equivalent to the sequence 5A, 5B, 5C, 5D, 5E and leads to the positions of the chains seen in the respective FIGS. 6E, 6F, 6G, 6H, 6I.

And finally, the sequence 5I, 5J, 5K is equivalent to the sequence 5A, 5B, 5C which gives the positions of the chains shown in 6I, 6J, 6K.

The end position of the chain corresponds to the greatest ratio and is thus achieved.

Thanks to the control device described above, it is possible in each position of the chain to exert a control AE1 or $-AE1$ which leads to the following or preceding position of the chain, or to exert a control of larger amplitude, which permits modifying more rapidly the position of the chain while skipping over several stages at a time.

There are thus available a total of eleven different suitably graduated ratios. The passage from the longest ratio toward the shortest (or vice versa) is effectuated by an elemental action on the left or right lever. The optimum alignment of the chain is always preserved. The path of the control member permits passing through several ratios at a time if desired. The indexation permits systematically placing the derailleurs such that the chain will engage perfectly in the pinion and the selected chain ring.

Of course, numerous other variations combining a linear displacement with an unrolling of the cable will lead similarly to the desired end and to numerous other arrangements than that proposed can be envisaged. Likewise, the combination of toothed wheels can be replaced by any other analogous system or by the use of a more flexible cable to connect the cylinder 42 to the adjustment device. This device for adjustment of the length permits the mounting of no matter what derailleur on the cycle but is not necessary. The cams 26 and 42 can be designed to effect suitable displacements of the cables which correspond to the changes of position of the chain. Finally, the control device may be any, provided that it responds to the stated criteria. The return of the levers L1 and L2 to the initial position after actuation is not indispensable but is highly preferable from an ergonomic point of view.

Figure 8:
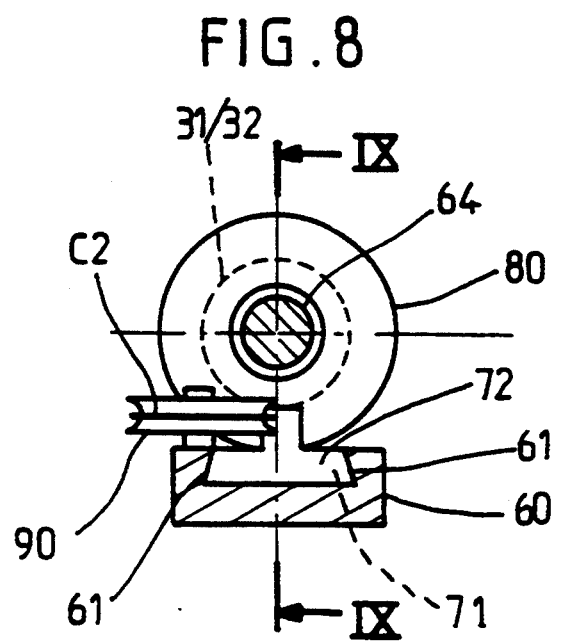
FIG. 8 is a transverse cross-sectional view of a control device according to a second embodiment of the invention.
Figure 9:
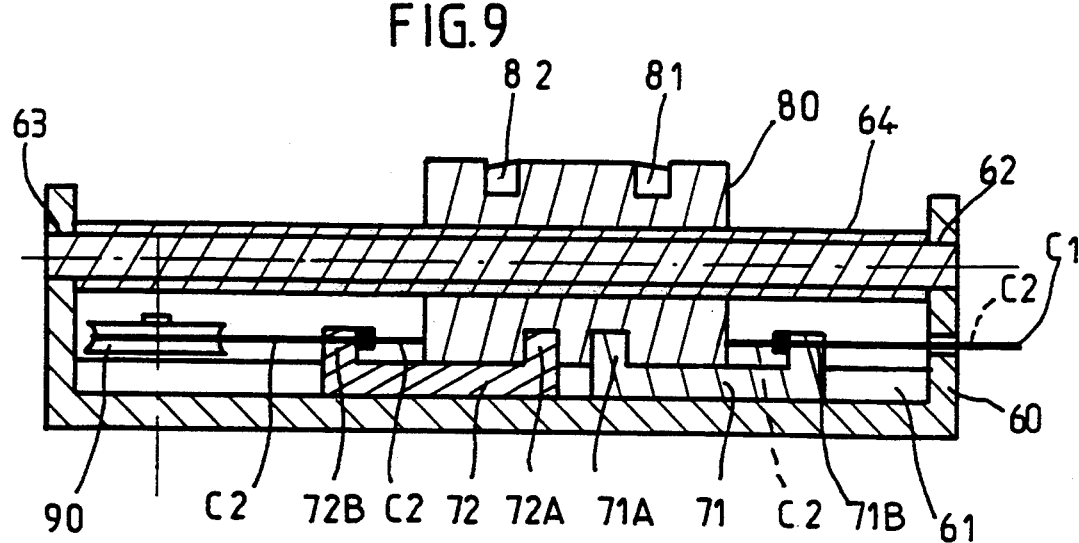
FIG. 9 is a cross-sectional view on the line IX—IX of FIG. 8.
Figure 10:
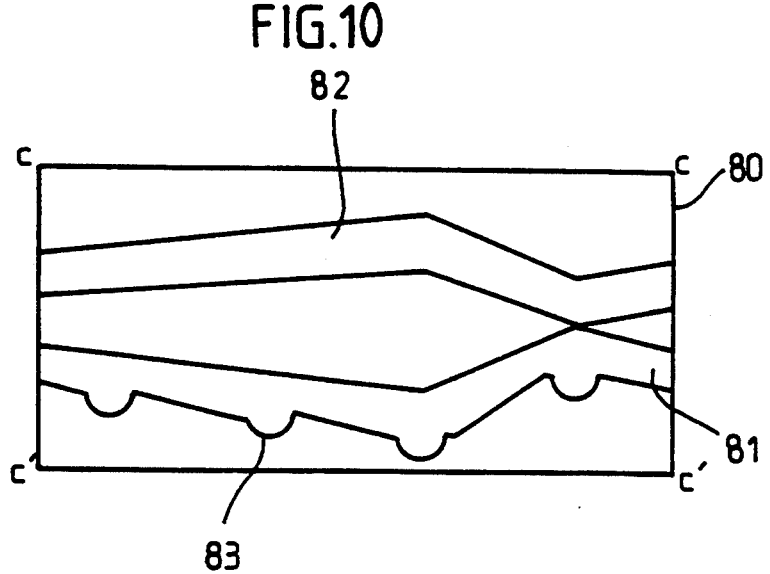
FIG. 10 is a developed view of a cylinder of the device according to FIGS. 8 and 9 in which are provided the grooves in the shape of a ramp.

According to a modification shown in FIGS. 8, 9 and 10, the control device differs essentially from the preceding in that it is constituted by a fixed table 60 secured to the cycle either on the frame C by means of two collars as in the preceding example, or on the handlebar G of the cycle, the control then taking place directly by turning the handlebar either in one direction or the other, which gives rise to the successive operations avoiding the necessity of providing another actuating device.

In this table 60 is provided a longitudinal groove 61 constituting a guide means in translation for the two carriages 71 and 72.

Two bearings 62 and 63 permit the mounting of a threaded rod 64, of special pitch, which is fixed relative to the table 60.

A cylinder 80 can be screwed by means of a threaded central hole on the rod 64. The periphery of the cylinder 80 is indented by two grooves in the form of two ramp-shaped grooves 81 and 82 whose development is shown in FIG. 10.

The groove 81 receives at its lower portion the lug 71A secured to the carriage 71, while the groove 82 receives similarly the lug 72A of the carriage 72.

The carriage 71 (or 72) is provided with a conventional pin blocking the cable of the derailleur 71B (or 72B) and can thus exert a traction on the cable $C_1$ (or $C_2$) which controls the rear or forward derailleur. For convenience, a pulley 90 returns the cable $C_2$ so that it leaves from the same side of the device as the cable $C_1$.

Adjustment members for the necessary lengths of each derailleur can be installed on the device using the corresponding mounting described for the preceding system, it being noted however that the pulley 90 can be adapted to fulfill this function as to the cable $C_2$. The adjustment members have not been shown in these figures.

The operation of this device will now be described with reference to FIGS. 6A to 6K, 8, 9 and 10.

In initial position, the chain occupies on the pinions the position shown in FIG. 6A. The device is actuated by an elemental action AE1 which causes cylinder 80 to turn by 90° about the threaded rod 64. This rotation has the following effects:

For the cable $C_1$:
  displacement of the lug 71A relative to the ramped cylinder 80 under the action of the groove 81 which is not in the plane perpendicular to the axle 64 and braking of the lug 71A in the recess 83 of the groove 81 to constitute an indexation in rotation of the cylinder 80 each 90°.
    this displacement has a length L toward the right in FIG. 9.
  simultaneously, the cylinder 80 is gripped on the threaded rod 64 and, given the pitch and orientation of these threads, this effects a displacement of said cam for a length L toward the right in FIG. 9.

In conclusion, the cable $C_1$ displaces over a length 2L toward the right.

For the cable $C_2$:
  the groove 82 being oriented symmetrically to the groove 81,
  the carriage 72 has a movement relative to the cylinder 80 of a length L toward the left in FIG. 9. Simultaneously, the cylinder 80 displaces by L toward the right of FIG. 9.

In conclusion, the cable $C_2$ does not move in the course of this first elemental action.

These displacements are of a nature to effect deformations of the rear and front derailleurs of the cycle which result in positioning the chain as shown in FIG. 6B.

A new elemental action AE1 produces the same effects and leads to the chain position shown in FIG. 6C; and the next time to produce the position of FIG. 6D.

The fourth elemental action AE1 leads to different results from those of the preceding actions:

For the cable $C_1$:
  the groove 81 undergoes a movement relative to the lug 71A of an amplitude 3L relative to the cam 80 toward the left in FIG. 9. This movement is compensated by the gripping of the cam 80 on the axle 64 which drives said cam by L toward the right of FIG. 9.

In conclusion, the cable $C_1$ moves by a length 2L toward the left in FIG. 9.

For the cable $C_2$:
  the groove 82 effects a relative movement of the lug 72A of an amplitude 3L toward the right in FIG. 9 and the gripping of the cam 80 on the axle 64 adds L to this displacement.

In conclusion, the carriage 72 displaces by a length 4L toward the right of FIG. 9.

These simultaneous displacements of the cables $C_1$ and $C_2$ are of a nature to deform the front and rear derailleurs of the cycle to lead to the position of the chain shown in FIG. 6E.

Further elemental actions AE1 then effect the progress of the same cycle of displacement of the two derailleurs starting from this new beginning position.

It will therefore be seen that, in this arrangement, the threaded rod 64 constitutes the member which fixes the initial positions of each commencement of the cycle of movement of the derailleurs, while the grooves 81 and 82 disposed on the cam 80 constitute the members which go through the cycle of displacement of the rear derailleur (for the groove 81) and of the front derailleur (for the groove 82).

This new mounting is thus another example of the application of the general principle defined initially.

Definitions of symbols:
X = Number of descents of the rear derailleur before rising.
LR = Length of the cable to obtain each change of a pinion to the rear.
LCR = Length of cable displaced under the action of the member which describes the cycle of operation of the rear derailleur.
LIR = Length of cable displaced under the action of the member which defines the initial conditions of each cycle of the rear derailleur.

The notation is similar for the forward derailleur by replacing R with V.

Operation of the rear derailleur:
During a pinion descent, we have: LR = LCR + LIR and thus X times.
During rising of the pinion, we have: $-LR = -X.LCR + LIR$ From which follows:

$$LCR = 2 \cdot LR/(X+1)$$

$$LIR = LR \cdot (X-1)/(X+1)$$

Operation of the forward derailleur:
During no change, we have: $LCV - LIV = 0$ and thus X times.
During change of chain ring, we have: $LV = X \cdot LCV + LIV$
From which follows:

$$LCV = LV/(X+1)$$

$$LIV = LV/(X+1)$$

The device which has been described can comprise various modifications. The control housing can be mounted on the handlebar, and can bear directly on the control members, so as to permit the user to keep hold of the handlebar and obtain a simplified assembly, easier to mount, and less bulky.

In this way the housing 20 with its linear displacement can be replaced by a beam with pendulous movement. The position of the axis of pivoting of this beam can be chosen so as to limit the bearing force on the cam, so as to facilitate the rotation of this latter.

Instead of direct action on the cables $C_1$ and $C_2$ by the member 20, sliding or oscillating, it can be provided to fix on this member 20 the abutments or hangers of each of the sleeves of these cables $C_1$ and $C_2$. The bearing of the member 20 on the cam 26 is thus effected by the tension of the cables themselves. A shock absorber device can be provided to diminish this bearing force, particularly during passages of the cam from the smallest to the largest ratio during a rotation of 90°. The displacement of the sleeves is equivalent to a displacement of the cables in the illustrated example.

I claim:

1. Control device for two derailleurs for bicycles comprising actuating means connected to the two derailleurs by transmission means ($C_1$, $C_2$), as well as a first member (26, 80) adapted to move through a cycle of displacement of the two derailleurs simultaneously, acting in combination with a second member (42, 64) adapted to fix the initial positions of each of these cycles,
   wherein said first member is a cam (26, 81, 82) driven in rotation relative to the second member (42, 64) under the action of actuating means, and acting relative to an element of a fixed portion (12, 60) of the device, whose reaction gives rise to movement of a part (20, 71, 72) of the device carrying at least one of said members, and to which are fixedly secured the transmission means ($C_1$, $C_2$), the displacement taking place simultaneously with the rotation of the first member (26, 80), so as to ensure a traction which is simultaneous and in the same direction on said transmission means ($C_1$, $C_2$), while giving rise to a displacement of one of these means relative to the other in one direction or the other according to a predetermined program.

2. Device according to claim 1, wherein said movable part (20) is slidably mounted.

3. Device according to claim 2, wherein the movable part (20) of the device moves on a fixed part secured to an element of the cycle by means of longitudinal slideways (21A, 21B).

4. Device according to claim 2, wherein the movable part is constituted by two carriages (71, 72) adapted to slide simultaneously in a longitudinal groove (61) in a fixed table (60) in one direction or the other under the conjugated action of two peripheral ramps (81, 82) which are not orthogonal relative to the axis of a cylinder (80) on which they are provided, said cylinder (80) being adapted to translate on a fixed threaded rod (64), during a rotative control exerted on it, the ramps (81, 82) mating respectively with lugs (71A and 72A) of the carriages (71, 72) on which are fixed the transmission means ($C_1$, $C_2$).

5. Device according to claim 1, wherein said movable part (20) is oscillably mounted.

6. Device according to claim 1, wherein the cam (26) is articulated in rotation about a fixed axle (24) fixed to the movable part (20), by means of a circular hole from the center of which extend a plurality of holes (26A, B, C, D) housing indexation means of radius r, and orthogonal to each other, whose centers lie on a circle of radius R and at a variable distance from the edge of the cam (26) respectively equal to $X+r+R$, $X+r+R+Y$, $X+r+R+2Y$, and so on, to constitute a predetermined program, wherein X is the distance between the edge of the cam and the edge of a first of said plurality of holes, $X+Y$ is the distance between the edge of the cam and the edge of the second of said plurality of holes, $X+2Y$ is the distance between the edge of the cam and the edge of a third of said plurality of holes, and so on.

7. Device according to claim 6, wherein the indexation means are constituted by at least one ball (27A and 27B) of a diameter greater than the holes (26A, B, C, D) on which they bear and which are guided in linear displacement in graduated recesses (23A, 23B) provided in a wall forming a cover of the movable part (20) of the device, said balls (27A, 27B) bearing resiliently against the cam (26) by a resilient member (28).

8. Device according to claim 7, wherein the resilient member (28) is adjusted in pressure by gripping more or less strongly by a nut (29) screwed on a free end of the axle (24).

9. Device according to claim 1 wherein the movable part (20) carries on the one hand the first member or cam (26) and on the other hand the second member (42) constituted by a cylinder, to which cylinder are fixedly secured the transmission means ($C_1$, $C_2$) whereby the rotation effected by the actuation means (L1, L2) gives rise, by means of a demultiplier (25, 32, 33, 41), to the rotation of the cam (26).

10. Device according to claim 9, wherein the demultiplier (25, 32, 33, 41) is a gear train.

11. Device according to claim 1, wherein the transmission means are cables having sleeves with abutments or hangers which are fixed to said movable part (20).

12. Synchronized control process for two derailleurs for bicycles of which one ensures the passage of the chain from one pedal chain ring to another pedal chain ring and the other ensures the passage of the chain from one pinion to another of the free wheel, comprising: when the chain tends to assume an inclination greater than a given limit, passing the chain from one chain ring to an immediately following chain ring and passing the chain from one pinion to an immediately adjacent pinion, said passages taking place by variation in the same direction of the number of teeth of the chain ring and of the pinion.

* * * * *